(No Model.)

C. M. MURCH.
TWO WHEELED VEHICLE.

No. 281,783. Patented July 24, 1883.

Attest:
G. W. Layman,
John Buler

Inventor.
Chauncey M. Murch,
by James N. Layman, Atty.

UNITED STATES PATENT OFFICE.

CHAUNCEY M. MURCH, OF CINCINNATI, OHIO.

TWO-WHEELED VEHICLE.

SPECIFICATION forming part of Letters Patent No. 281,783, dated July 24, 1883.

Application filed April 20, 1883. (No model.)

*To all whom it may concern:*

Be it known that I, CHAUNCEY M. MURCH, a citizen of the United States, residing at Cincinnati, in the county of Hamilton and State of Ohio, have invented certain new and useful Improvements in Two-Wheeled Vehicles, of which the following is a specification, reference being had therein to the accompanying drawings.

My invention relates to a two-wheeled vehicle, the peculiar construction of which renders the body especially adapted to be supported on either of the forms of springs seen in the several patents granted to me April 14, 1874, June 16, 1874, and April 13, 1880.

The present improvement comprises a novel combination of devices wherewith the shaft-irons and springs are so clipped to the axle as to prevent them shifting either longitudinally or transversely, as hereinafter more fully described.

Figure 1:
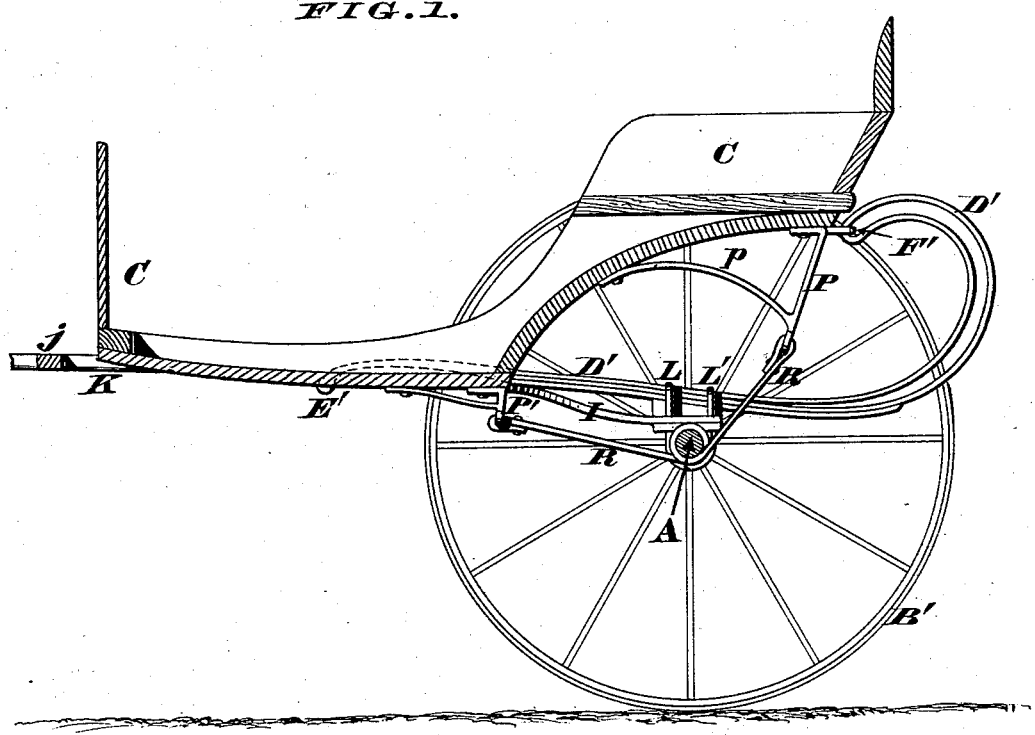
Figure 2:
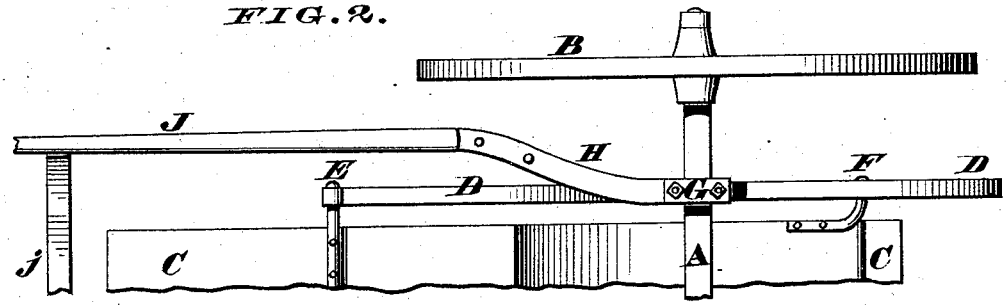
Figure 3:
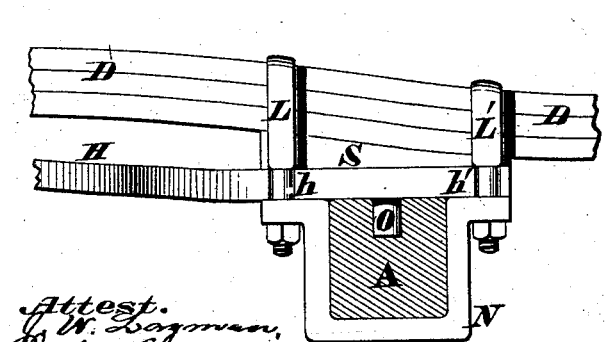
Figure 4:
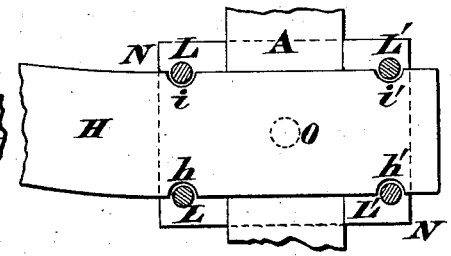

In the annexed drawings, Figure 1 is a vertical section of my vehicle, taken in the plane of the aforesaid tie or keeper. Fig. 2 is a plan of a portion of the under side of the vehicle. Fig. 3 is an enlarged transverse section of the axle, taken in the plane of the shaft-iron coupling. Fig. 4 is a horizontal section of said coupling, taken in the plane of the upper surface of said iron.

A represents the axle, B B' the wheels, and C the body, of a two-wheeled vehicle or dog-cart, said body being supported on a pair of side springs, D D', of any suitable construction. Said springs, however, are here represented as being made according to the drawings and specifications of the patent issued to me April 13, 1880, although the springs seen in either of my other patents will be found very useful in this vehicle.

E E' represent the attaching-bars at the front ends of said springs D D', and F F' the rods to which the rear or elevated ends of the same are coupled. These springs may be secured to axle A with an ordinary clip, as seen at G in Fig. 2; but I prefer the following combination of fastening devices.

H I represent shaft-irons, the front ends of which are bent outwardly, or toward the wheels B B', as more clearly seen in Fig. 2, and have the shafts J K attached thereto. $j$ is the splinter-bar of these shafts. It will be noticed that this arrangement of bent shaft-irons affords sufficient space between them and the sides of body C to let the front ends of springs D D' play vertically to any proper extent. Furthermore, the rear portions of these irons are notched on their opposite edges, as at $h\ h'\ i\ i'$, to receive the rounded shanks of clips L L', which latter embrace the springs, and are fastened to a plate, N. By this arrangement the shaft-irons and springs are immovably clamped to axle A, the attachment being rendered still more secure by a stump, O, projecting from each shaft-iron and entering a socket in said axle. It is evident these stumps prevent lateral spreading of the shafts, while the clips and notches secure said shafts against longitudinal shifting.

Attached near the back of body C is an inclined bar, P, stiffened with a brace, $p$, and having at its lower end an eye or loop to receive one end of a strap, R, which latter is secured to axle A, and has its other end attached to another bar, P', the latter bar being situated in front of and somewhat above the level of said axle. It is evident these bars and straps serve as an elastic tie or keeper that prevents the injurious and disagreeable surging back and forth of the vehicle-body when it is left free to follow the motions of the horse. This flexible tie, however, leaves said body at liberty to oscillate vertically on the springs D D'. Finally, a block, S, may be interposed between shaft-iron H and the spring D.

I claim as my invention—

The combination of axle A, spring D, clips L L', plate N, and shaft-iron H, the latter being notched at $h\ h'\ i\ i'$, for the purpose described.

In testimony whereof I affix my signature in presence of two witnesses.

CHAUNCEY M. MURCH.

Witnesses:
JAMES H. LAYMAN,
JOHN A. PENN.